(12) United States Patent
Wen

(10) Patent No.: US 9,572,081 B2
(45) Date of Patent: Feb. 14, 2017

(54) COMMUNICATION METHOD AND APPARATUS IN A MULTI-HOP COMMUNICATION SYSTEM

(71) Applicant: FUJITSU LIMITED, Kawasaki-shi, Kanagawa (JP)

(72) Inventor: Yun Wen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 14/231,181

(22) Filed: Mar. 31, 2014

(65) Prior Publication Data

US 2014/0313885 A1 Oct. 23, 2014

(30) Foreign Application Priority Data

Apr. 17, 2013 (JP) ................................. 2013-086241

(51) Int. Cl.
*H04W 40/02* (2009.01)
*H04L 12/703* (2013.01)
*H04L 12/705* (2013.01)

(52) U.S. Cl.
CPC .............. *H04W 40/02* (2013.01); *H04L 45/18* (2013.01); *H04L 45/28* (2013.01)

(58) Field of Classification Search
CPC .......... H04L 45/18; H04L 45/28; H04W 40/02
See application file for complete search history.

(56) References Cited

U.S. PATENT DOCUMENTS

| 2004/0218582 | A1 | 11/2004 | Kennedy et al. |
| 2006/0002366 | A1 | 1/2006 | Kawaguchi et al. |
| 2008/0095047 | A1* | 4/2008 | Skalecki ............. H04L 41/0668 370/225 |
| 2008/0310340 | A1 | 12/2008 | Isozu |
| 2009/0310610 | A1* | 12/2009 | Sandstrom .............. H04L 45/00 370/392 |
| 2012/0033567 | A1* | 2/2012 | Yamada ................ H04L 45/125 370/252 |
| 2012/0051252 | A1 | 3/2012 | Iwao et al. |

FOREIGN PATENT DOCUMENTS

| JP | 2004-336767 A | 11/2004 |
| JP | 2005-64721 A | 3/2005 |
| JP | 2005-252452 A | 9/2005 |
| JP | 2006-20221 A | 1/2006 |
| WO | WO 2010/131288 A1 | 11/2010 |

\* cited by examiner

*Primary Examiner* — Jackie Zuniga Abad
(74) *Attorney, Agent, or Firm* — Arent Fox LLP

(57) ABSTRACT

A node device for a wireless communications, includes: a memory; and a processor coupled to the memory and configured to: select an adjacent node device sending a packet to further adjacent node device prior to the node device, from among a plurality of adjacent node devices that communicate with the node device directly, based on record information regarding the further adjacent node device to which the plurality of adjacent node devices sent packets, the further adjacent node device communicating with the plurality of the adjacent node devices directly, and transmit the packet to the selected adjacent node device.

13 Claims, 11 Drawing Sheets

FIG. 4

| GD | LD | PATH COST | PRIORITY | FLAG |
|---|---|---|---|---|
| ADDRESS OF SN | ADDRESS OF SN | 1 | 1 | 1 |
| ADDRESS OF SN | ADDRESS OF Nb | 3 | 2 | 1 |
| ADDRESS OF SN | ADDRESS OF Nd | 3 | 2 | 0 |
| ADDRESS OF SN | ADDRESS OF Ne | 3 | 2 | 0 |

FIG. 5

| ADJACENT NODE | TRANSMISSION RECORD INFORMATION |
|---|---|
| SN | 0 |
| Nb | 1 |
| Nd | 6 |
| Ne | 5 |

FIG. 6

| ADJACENT NODE | NUMBER OF ALL DATA PACKETS | NUMBER OF DATA PACKETS OF WHICH DESTINATIONS ARE INTERESTED NODE | TRANSMISSION RECORD INFORMATION |
|---|---|---|---|
| SN | 0 | 0 | 0 |
| Nb | 10 | 1 | 0.1 |
| Nd | 6 | 6 | 1 |
| Ne | 20 | 16 | 0.8 |

COMMUNICATION METHOD AND APPARATUS IN A MULTI-HOP COMMUNICATION SYSTEM

CROSS-REFERENCE TO RELATED APPLICATION

This application is based upon and claims the benefit of priority of the prior Japanese Patent Application No. 2013-086241 filed on Apr. 17, 2013, the entire contents of which are incorporated herein by reference.

FIELD

The embodiments discussed herein are related to communication technique for an autonomous distributed network.

BACKGROUND

In recent years, autonomous distributed networks are used, which are ad-hoc networks or the like and formed by communication between communication devices and do not use a network infrastructure including a base station, an access point, and the like.

In an autonomous distributed network, many communication devices are connected to each other without an access point by using a technique used for wireless connections of, for example, computers, personal digital assistants (PDAs), mobile phones, and the like. The many communication devices each transmit and receive a packet by multi-hop communication. The multi-hop communication is a technique that enables each of communication devices that exist in different communication areas to communicate with the other communication device through another communication device that exists in the communication area in which the interested communication device exists. The communication devices are referred to as nodes that exist in the network.

Traditionally, a technique for causing the nodes to form communication paths in the network is known. Each of the nodes uses this technique to autonomously form communication paths extending from the interested node to a final destination of a data packet. Each of the nodes treats, as a priority path, a communication path that is among paths extending from the interested node to the final destination and of which the quality is highest. The smaller a path cost that depends on the number of hops and the like in multi-hop communication, the higher the quality of the path.

A topology is frequently changed in the autonomous distributed network, unlike a traditional fixed network. Thus, a priority path formed upon, the formation of the paths may not be used for actual transmission of a data packet. In consideration of such situations, each of the nodes holds an alternative path that is not a priority path and is among a plurality of communication paths. For example, if a communication failure occurs in a priority path, an interested node transmits a data packet using an alternative path.

As a method for determining an alternative path, a method for selecting, as the alternative path, a communication path in which the number of hops is small is known, for example. In addition, a method for selecting an alternative path based on a spatial correlation between the alternative path and a priority path is also known.

In addition, there is a method in which a path request message that is used for routing includes a relay node list field in order to form paths and is discarded by each of nodes if addresses of the nodes exist in the relay node list field. Specifically, the method inhibits the path request message from being looped and enables the nodes to form a plurality of paths that are not looped.

In addition, for formation of a path related to a wired ad-hoc network, there is a method for learning the occurrence of a loop by a certain node device when a first frame transmitted by the certain node device is looped in the network and received as a second frame by the certain node device. The node device uses a loop detection table to learn a port that causes the occurrence of the loop. Then, the node device does not transmit a frame to the port that causes the occurrence of the loop.

Those methods are disclosed in, for example, Japanese Laid-open Patent Publications Nos. 2004-336767, 2005-252452, 2005-64721, and 2006-20221 and International Publication No. WO2010/131288.

SUMMARY

According to an aspect of the invention, a node device for a wireless communications, includes: a memory; and a processor coupled to the memory and configured to: select an adjacent node device sending a packet to further adjacent node device prior to the node device, from among a plurality of adjacent node devices that communicate with the node device directly, based on record information regarding the further adjacent node device to which the plurality of adjacent node devices sent packets, the further adjacent node device communicating with the plurality of the adjacent node devices directly, and transmit the packet to the selected adjacent node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of data stored in a path information storage unit;

FIG. 5 is a diagram illustrating an example of data stored in a transmission record information storage unit;

FIG. 6 is a diagram illustrating an example of data stored in the transmission record information storage unit according to another embodiment;

DESCRIPTION OF EMBODIMENTS

In the method for determining an alternative path based on the number of hops and the method for determining an alternative path based on a spatial correlation, a communication path in which a loop occurs may be determined as the alternative path. Specifically, if a failure occurs in a priority path of an interested node, and a certain node retransmits a packet to the alternative path, the packet may be returned to the interested node.

In the method in which a relay node field is provided in a path request message, a path that avoids a loop may be formed. However, the amount of data of the path request message to be transmitted and received between nodes in order to form a path increases by an amount corresponding to a relay node list. Eventually, a load of an overall network increases.

In the method for detecting a loop by receiving a frame transmitted by an interested node, the frame is transmitted to each port. Specifically, a path that includes a port predicted to cause the occurrence of a loop may not be formed.

Under such circumstances, according to an aspect, an object of embodiments is to appropriately form a communication path for a data packet.

The embodiments are described in detail below. In the embodiments, two or more of processes may be combined as, long as the combination does not contradict details of the processes. Hereinafter, the embodiments are described with reference to the accompanying drawings, to the following description, an ad-hoc network is used as an example of an autonomous distributed network.

Figure 1:
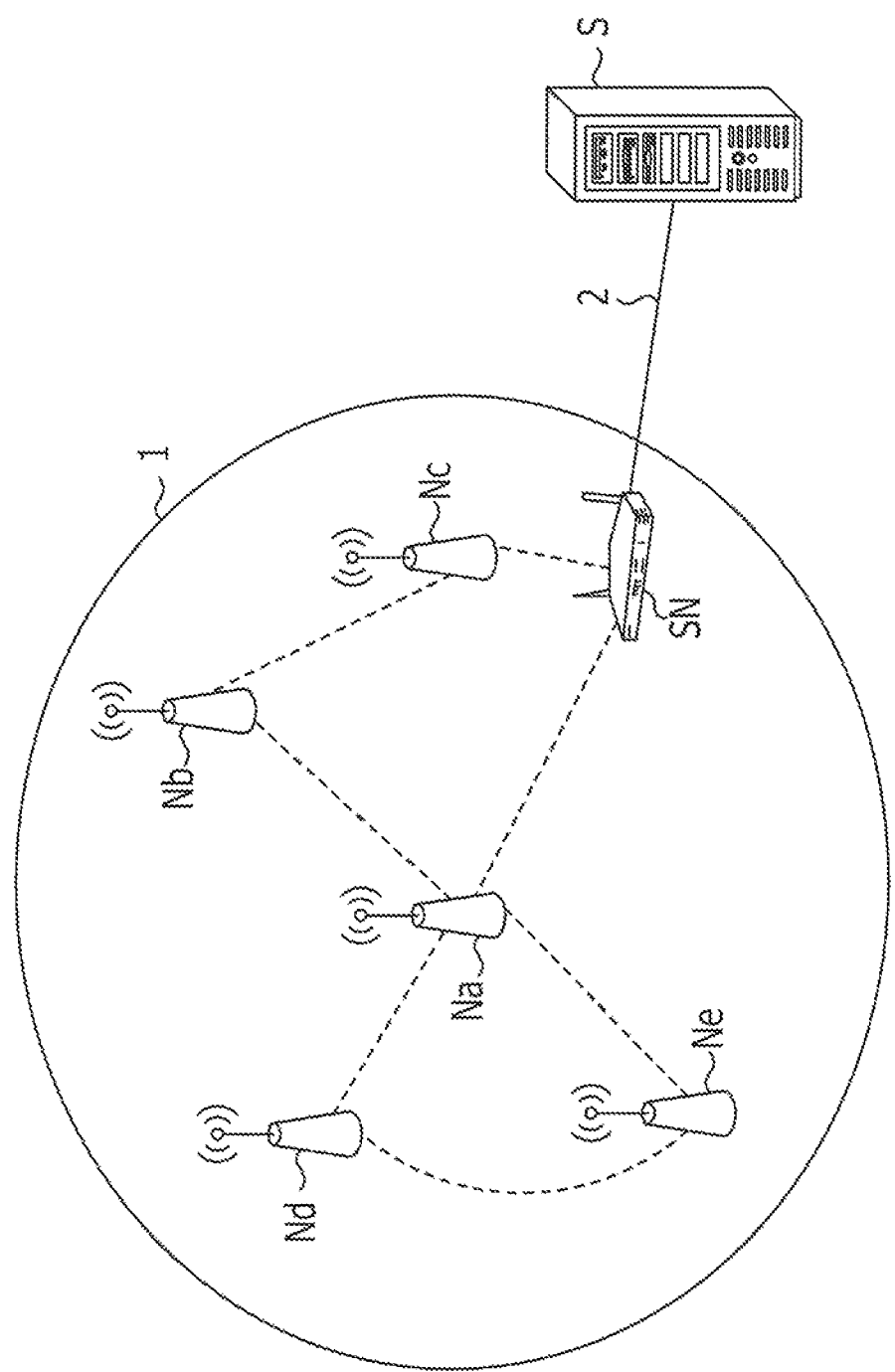
FIG. 1 is a diagram illustrating an ad-hoc network system according to an embodiment.

FIG. 1 is a diagram illustrating an ad-hoc network system according to an embodiment. The ad-hoc network system includes a plurality of nodes Nx, a sink node SN and a server S.

The server S and the sink node SN are connected to each other through a network 2 such as the Internet, a LAN or a WAN. The network 2 is a fixed network, for example. The sink node SN and the nodes Nx are connected to each other through an ad-hoc network 1. The nodes Nx are computers that may execute radio communication.

The plurality of nodes Nx are installed in the ad-hoc network 1. FIG. 1 illustrates nodes Na to Ne as representative examples. Hereinafter, if the nodes Na to Ne are not distinguished, the nodes Na to Ne are referred to as nodes Nx.

The sink node SN is a relay device that connects the ad-hoc network 1 to the network 2. The sink node SN is a gateway device, for example. The sink node SN may transmit and receive both information in the form of a protocol of the ad-hoc network 1 and information in the form of a protocol of tip network 2.

In addition, the sink node SN converts a protocol of information between the ad-hoc network 1 and the network 2. For example, a protocol of a packet transmitted by any of the nodes Nx included in the ad-hoc network 1 toward the server S is converted by the sink node SN. After that, the sink node SN transmits the packet to the network 2, and the packet reaches the server S.

The server S is a computer that manages the ad-hoc network 1 and collects data from the nodes Nx.

The nodes Nx are devices that may each directly communicate with another node Nx existing in a communication-enabled area or directly communicate with the sink node SN existing in the communication-enabled area. In addition, each of the nodes Nx may communicate with the other nodes Nx and the sink node SN through a node that may directly communicate with an interested node, while the other nodes Nx and the sink node SN do not directly communicate with the interested node. Specifically, each of the nodes Nx uses formed paths to communicate with the other nodes Nx and the sink node SN.

In FIG. 1, the nodes Nx connected to each other as indicated by dotted lines may directly communicate with each other. Nodes Nx that may communicate with an interested node Nx are referred to as adjacent nodes of the interested node.

Each of the nodes Nx transmits and receives packets of various types to and from adjacent nodes. Examples of the packets of the various types are a hello packet and a data packet.

The hello packet is a packet to be broadcasted and is not transferred by multi-hop communication. The hello packet that is transmitted by each of the nodes Nx is used to notify the other nodes of the existence of the interested node, while the other nodes may directly communicate with the interested node.

The data packet is a packet to be transmitted in unicast in accordance with path information and transferred by multi-hop communication to a global destination GD (described later). In addition, the data packet includes data acquired by each of the nodes.

Figure 2:
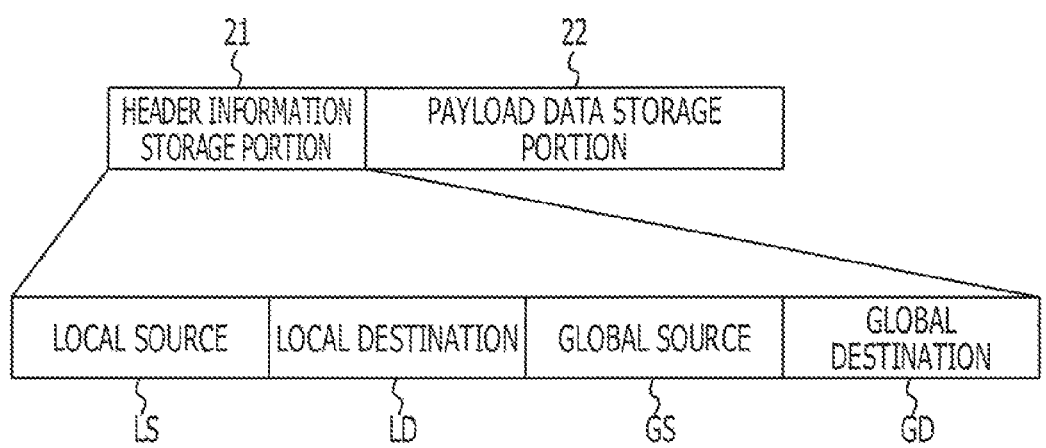
FIG. 2 is a diagram illustrating an example of the configuration of data of a packet.

FIG. 2 is a diagram illustrating an example of the configuration of data of each of the packets of the various types. A packet illustrated in FIG. 2 has a header information storage portion 21 and a payload data storage portion 22.

In the header information storage portion 21, information of a local source LS, a local destination LD, a global source GS, and a global destination GD is stored. In the header information storage portion 21, information of a packet type indicating the type of the packet and the like may be stored.

The local source LS is information that indicates a source of the packet. For example, the local source LS is information of an address of the source in communication of a single hop. The local destination LD is information that indicates a destination of the packet. For example, the local destination LD is information of an address of the destination in communication of a single hop.

The global source GS is information that indicates a start point of a path for the packet. For example, the global source GS is information of an address of a source in initial communication of multi-hop communication. The global destination GD is information that indicates an end point of the path for the packet. For example, the global destination GD is information of an address of a destination in last communication of the multi-hop communication.

If the packet is a broadcast packet such as a hello packet, a broadcast address is set as the local destination LD. For example, an address "255.255.255.255" that is prepared in advance is set. If the packet is not transmitted in multi-hop communication like the hello packet, the global source GS and the global destination GD are not set. Alternatively, a fictitious address "080.000.000.000" or the like is set.

If the packet is a unicast packet such as a data packet, an address of a node Nx that is a next destination is set as the local destination LD based on the formed path. If the packet is to be transmitted in multi-hop communication like the data packet, the address of the node Nx that is the start point of the path is set as the global source GS, and an address of a node Nx or sink node SN, which is the end point of the path, is set as the global destination GD.

In the ad-hoc network 1, data packets are finally collected by the sink node SN. In the embodiment, data included in the data packets is collected by the server S through the sink node SN.

Data that varies depending on the packet is stored in the payload data storage portion 22. If the packet is the hello packet, the number of hops from the sink node SN and information of a time when the hello packet is generated are stored in the payload data storage portion 22.

If the packet is the data packet, data to be transmitted to the sink node SN is stored in the payload storage portion 22. In addition, a value that is used to verify the data packet may be stored in the payload storage portion 22. For example, a message authentication code (MAC) or the like is used. In addition, the data stored in the payload storage portion 22 may be encrypted. Although the embodiment omits a description of an encryption process and a data authentication process, it is preferable that the encryption process and the data authentication process be executed to ensure security.

Next, generation of path information using a hello packet is described below. The nodes Nx each use a hello packet to form paths within the ad-hoc network 1. The formed paths are stored as path information. The path information includes global destinations GD (described later) and local destinations LD. Specifically, the paths are formed for the local destinations LD (adjacent nodes), respectively. The path information may include information (priorities) that indicates qualities of the paths.

The nodes Nx and the sink node SN each periodically transmit a hello packet. First, the nodes Nx may each recognize adjacent nodes by receiving hello packets from the other nodes. In addition, the nodes Nx each recognize path costs of paths extending through adjacent nodes based on the hello packets received from the adjacent nodes.

The path costs are values to be used to evaluate the qualities of the paths extending from the interested node to the global destinations GD. In the embodiment, each of the path costs depends on the number of hops from the interested node to a global destination GD. The path costs may be determined based on the numbers of hello packets received from the adjacent nodes per unit time. At least one of a path cost and information to be used to calculate the path cost is set in each of hello packets.

For example, in FIG. 1, the adjacent nodes Na and Nc of the sink node SN each receive a hello packet of the sink node SN. The hello packet includes information to be used to calculate a path cost that indicates that the number of hops is 1.

The node Na that has received the hello packet adds "1" to the number of hops and generates a hello packet that has, set therein, information indicating that "the number of hops is 2". Then, the hello packet is broadcasted. In this case, the broadcasted hello packet is received by the sink node SN and the adjacent nodes Nb, Nd, and Ne of the node Na. Similarly, the nodes Nb, Nd, and Ne that have received the hello packet each add "1" to the number of hops and broadcast a hello packet that has, set therein, information indicating that "the number of hops is 3".

In this case, the node Na receives, from the sink node SN, the hello packet having set therein the information indicating that "the number of hops is 1", and the node Na thereby recognizes a path that is among paths extending to the sink node SN and through which the node Na directly transmits and receives a packet to and from the sink node SN. Then, the node Na obtains a path cost "1" for the recognized path. In the embodiment, the number of hops is treated as a path cost. The path cost, however, is not limited to the number of hops and may be another value calculated using the number of hops.

In addition, the node Na receives, from the node Nb, the hello packet having the information indicating that "the number of hops is 3", and the node Na thereby recognizes a path that is among the paths extending to the sink node SN and extends through the node Nb. Then, the node Na obtains a path cost "3" for the recognized path. Similarly, the node Na recognizes a path that is among the paths extending to the sink node SN and extends through the node Nd, and the node Na obtains a path cost "3" for the recognized path.

After one or more paths are formed, each of the nodes Nx sets, to a priority path, a path of which the quality is highest based on path costs of the paths. For example, the node Na sets, to the priority path, a path that is among the paths extending to the sink node SN and for which the sink node SN is set as local destination LD.

In the present embodiment, each of the nodes Nx monitors data packets transmitted by adjacent nodes and acquires transmission record information of the adjacent nodes. The transmission record information is information on destinations (local destinations LD) of the packets transmitted by the adjacent nodes.

For example, the transmission record information is the ratios of the numbers of data packets of which local destinations LD are the interested node to the numbers of data packets transmitted by the adjacent nodes. In the ad-hoc network, if each of the nodes periodically transmits a data packet, each of the nodes may use the number of packets received from each of adjacent nodes, instead of the ratios.

Then, each of the nodes Nx estimates priority paths of adjacent nodes based on the transmission record information. Each of the nodes Nx selects, as an alternative path, an adjacent node having a priority path for which a node other than the interested node is set as a local destination LD. In other words, each of the nodes Nx does not select, as an alternative path, an adjacent node of which a priority path extends through the interested node.

When the node Na has paths extending through the adjacent nodes "Nb", "Nd", and "Ne", the node Na acquires transmission record information of the adjacent nodes "Nb", "Nd", and "Ne". For example, it is assumed that a rate at which the node Nb uses a path for which the node Na is set as a local destination LD is equal to or lower than a threshold. Based on this assumption, the node Na estimates that a priority path selected by the adjacent node Nb does not extend through the interested node Na.

Thus, if the node Na detects that a communication failure occurs on a priority path of the interested node Na, the node Na selects, as an alternative path, a path extending through the adjacent node Nb and may inhibit a packet from being returned to the interested node Na.

On the other hand, if the node Na determines that a rate at which the node Nd uses a path for which the interested node Na is set as a local destination LD is larger than the threshold, the node Na estimates that a priority path selected by the adjacent node Nd extends through the interested node Na.

Thus, if the node Na detects that a communication failure occurs on the priority path of the interested node Na, and the node Na selects, as an alternative path, a path extending through the adjacent node Nd, a data packet is looped and returned to the interested node Na. Specifically such wasteful packet transmission may be avoided by specifying a path in which a loop is formed, and an increase in a load of the network may be inhibited.

Thus, according to the present embodiment, an interested node Nx estimates priority paths of adjacent paths and thereby does not select, as an alternative path, a path that causes a data packet to be returned to the interested node Nx. In the present embodiment, an increase in a load of the overall network may be inhibited.

Figure 3:
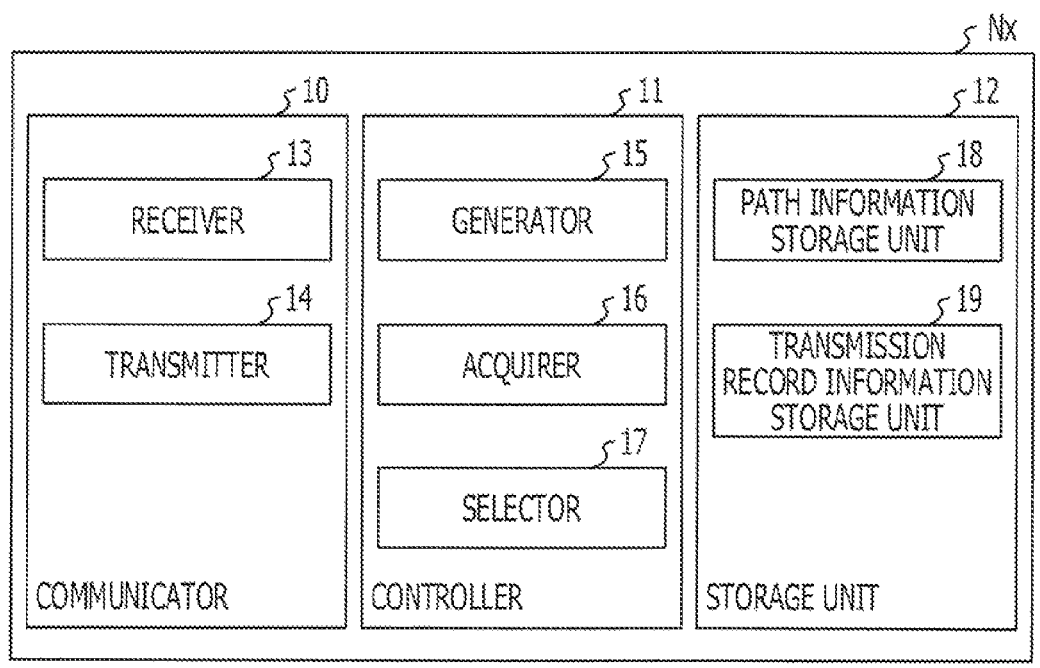
FIG. 3 is a functional block diagram of a node Nx.

Next, a functional configuration of each of the nodes Nx is described. FIG. 3 is a functional block diagram of the node Nx. The node Nx includes a communicator 10, a controller 11, and a storage unit 12.

The communicator 10 is a processing unit that transmits and receives a packet to and from at least a part of the other nodes Nx and the sink node SN that form the ad-hoc network 1. The controller 11 is a processing unit that controls processes of the overall node Nx. For example, the controller 11 generates packets of various types, generates path information, acquires transmission record information, and the like. The storage unit 12 is a storage device for storing information of various types.

The communicator 10 includes a receiver 13 and a transmitter 14. The receiver 13 is a processing unit that receives information from the adjacent nodes. For example, the receiver 13 receives a hello packet and a data packet. The transmitter 14 is a processing unit that transmits information to the adjacent nodes. For example, the transmitter 14 broadcasts a hello packet and transmits a data packet to a specific adjacent node.

The controller 11 includes a generator 15, an acquirer 16, and a selector 17. The generator 15 acquires the hello packet received by the receiver 13 and generates path information based on the hello packet. Then, the generator 15 causes the generated path information to be stored in a path information storage unit 18. The generator 15 periodically generates path information and updates path information stored in the path information storage unit 18.

The acquirer 16 acquires transmission record information on destinations of packets transmitted by the adjacent nodes that may directly communicate with the interested node. For example, the acquirer 16 generates transmission record information based on a data packet. Then, the acquirer 16 causes the transmission record information to be stored in a transmission record information storage unit 19. The acquirer 16 periodically generates transmission record information and updates transmission record information stored in the transmission record information storage unit 19.

The selector 17 selects a local destination LD of a data packet. Then, the selector 17 sets various addresses in header information of the data packet and requests the transmitter 14 to transmit the data packet.

For example, if a data packet fails to be transmitted using a priority path, the selector 17 selects an adjacent node as an alternative path based on transmission record information. In this case, the selected adjacent node is among the adjacent nodes and has a priority path that does not extend through the interested node.

If an adjacent node that is selectable as an alternative path does not exist, the selector 17 controls the transmitter 14 and causes the transmitter 14 to transmit an alarm signal. The alarm signal is a signal that notifies the adjacent nodes that the interested node does not have a path that avoids a loop and is not a priority path of the interested node. The selector 17 of the node Nx that receives an alarm signal from a certain node reforms a path so that the path that extends through the certain adjacent node that is a source of the alarm signal does not include any part of a path through which the data packet is transmitted.

The storage unit 1 includes the path information storage unit 18 and the transmission record information storage unit 19. The path information storage unit 18 stores path information. The path information storage unit 18 is also referred to as a routing table in general. The transmission record information storage unit 19 stores transmission record information.

FIG. 4 is a diagram illustrating an example of data stored in the path information storage unit 18. FIG. 4 indicates the path information storage unit 18 of the node Na illustrated in FIG. 1.

The path information storage unit 18 stores global destinations GD, local destinations LD, path costs, priorities, and flags, while the global destinations GD, the local destinations LD, the path costs, the priorities, and the flags are associated.

In a field for the global destinations GD, addresses of devices that are end points of paths are stored. In the present embodiment, since data packets are collected by the sink node SN, an address of the sink node SN is stored in the field for the global destinations GD.

In a field for the local destinations LD, addresses of the adjacent nodes are stored. The local destinations LD indicate paths extending through the adjacent nodes. For example, addresses of the adjacent nodes "SN", "Nb", "Nd", and "Ne" are stored in the field for the local destinations LD.

In a field for the path costs, values related to the qualities of the paths are stored. In the present embodiment, the numbers of hops from the interested node to the global destinations GD are used as the path costs. The generator 15 acquires the numbers of hops from hello packets received from the adjacent nodes and causes the acquired numbers to be stored as the path costs.

For example, for the path extending through the adjacent node "Nb" path cost "3" is stored. The generator 15 may calculate a path cost based on the number of hops and cause the calculated path cost to be stored in the path information storage unit 18.

In a field for the priorities, information that indicates the qualities of the paths based on the path costs of the paths is stored. In the present embodiment, the smaller a path cost, the higher a priority (or the smaller the value of the priority). For example, a priority "1" is added to a path for which a path cost "1" is set. The path that has the priority "1" added thereto serves as a priority path. Paths that have a priority "2" added thereto serve as alternative paths.

In the example illustrated in FIG. 4, path costs of paths for which the adjacent nodes "Nb", "Nd", and "Ne" are set as local destinations are equal to each other. Thus, the priority "2" is added to each of the three paths. However, if a loop is formed in a path having the priority "2" added thereto, the path in which the loop is formed is excluded from alternative paths by referencing transmission record information.

The flags are information that is generated based on transmission record information and indicates whether or not the paths are selectable as alternative paths is stored. A flag "1" indicates that an interested path is selectable as an alternative path. A flag "0" indicates that an interested path is not selectable as an alternative path. In initial states, the flags are set to "1".

The acquirer 16 references the transmission record information storage unit 19 (described later) and sets the flag "1" for an adjacent node of which a priority path does not extend through the interested node. The path information storage unit 18 may not have the field for the flags, and the selector 17 may reference the transmission record information storage unit 19 and determine whether or not paths are selectable as alternative paths.

In the present embodiment, the global destinations GD, the local destinations LD, the path costs, and the priorities are referred to as path information. The path information is generated by the generator 15. The path information storage unit 18 stores the path information and the flags associated with the path information. The flags are information that is set by the acquirer 16 based on transmission record information.

FIG. 5 is a diagram illustrating an example of data stored in the transmission record information storage unit 19. FIG. 5 indicates the transmission record information storage unit 19 of the node Na. The transmission record information storage unit 19 stores information of the adjacent nodes and the transmission record information associated with the information of the adjacent nodes.

The information of the nodes that may directly communicate with the interested node is stored in a field for the adjacent nodes. When the receiver 13 receives a hello packet, the generator 15 forms a path. As described above, the interested node may recognize the adjacent nodes by receiving hello packets. Every time the interested node recognizes an adjacent node that may directly communicate with the interested node, the generator 15 adds information of the adjacent node to the transmission record information storage unit 19. For example, an ID and an address of the adjacent node are stored in the transmission record information storage unit 19.

Information on destinations of data packets transmitted by the adjacent nodes is stored in the transmission record information. For example, if the nodes each periodically transmit a data packet in the ad-hoc network system, the number of data packets in which the interested node is set as local destinations and that are received by the interested node in a certain time period is stored as the transmission record information.

It is sufficient if the adjacent nodes are set in fields for local sources LS of the data packets. Global sources GS may not be the adjacent nodes. If the number of times of retransmission is set in a data packet, the data packet retransmitted is not counted.

For example, if each of the nodes Nx transmit a data packet once in ten minutes in the ad-hoc network system, the acquirer 16 calculates the number of data packets in which the interested node is set as local destinations LD and that have been received per hour.

The example illustrated in FIG. 5 indicate that the node Na receives, from the adjacent node Nb, a data packet in which the interested node Na is a local destination LD once in one hour. Thus, it is apparent that the adjacent node Nb uses a path extending through the node Na only once in one hour, regardless of the fact that the node Nb transmits six data packets per hour.

Thus, it is estimated that the node Nb normally uses another path as a priority path. When the node Na transmits a data packet to a path extending through the node Nb, the data packet is received by the node Nb and transferred to a node other than the node Na through the priority path of the node Nb.

On the other hand, it is apparent that the node Nd uses a path extending through the node Na six times in one hour. Thus, the node Na may estimate that the node Nd uses, as a priority path, a path extending through the interested node Na. When the node Na transmits a data packet to a path extending through the node Nd, the data packet is received by the node Nd and transferred to the interested node Na through the priority path of the node Nd. Thus, a loop is formed.

The acquirer 16 specifies, based on the transmission record information, an adjacent node satisfying a requirement as an adjacent node of which a priority path does not extend through the interested node. For example, if a value stored as transmission record information is equal to or smaller than a threshold, the acquirer 16 determines that the requirement is satisfied.

The threshold is a value set by referencing an interval at which a data packet is transmitted and a period in which transmission record information is collected. For example, if each of the nodes Nx transmits a data packet once in ten minutes in the network and collects transmission record information once every hour, the threshold is set to 4.

The acquirer 16 sets "1" to a flag of the path information storage unit 18 for a path that extends through an adjacent node of which a priority path does not extend through the interested node. The acquirer 16 sets "0" to a flag of the path information storage unit 18 for a path that extends through an adjacent node of which a priority path extends through the interested node. The selector 17 selects, as an alternative path, a path having the highest priority from among paths for which the flag "1" is set.

If flag information related to transmission record information is not stored, the selector 17 specifies, in order to determine a transmission path of a data packet, an adjacent node corresponding to transmission record information equal to or smaller than the threshold and selects, as an alternative path, a path for which the adjacent node is set as a local destination LD.

Next, transmission record information when the nodes Nx each irregularly transmit a data packet is described. FIG. 6 is a diagram illustrating an example of data stored in the transmission record information storage unit 19 according to another embodiment.

The transmission record information storage unit 19 according to the other embodiment stores the adjacent nodes, the numbers of all data packets, the numbers of data packets of which destinations are the interested node, and transmission record information, all of which are associated with each other.

Information of the nodes that may directly communicate with the interested node is stored in a field for the adjacent nodes. In a field for the numbers of all the data packets, the number of data packets transmitted by each of the adjacent nodes in a certain time period is stored. Specifically, the numbers of the received data packets in which the addresses of the adjacent nodes are set as local sources LS are stored.

In a field for the numbers of data packets of which destinations are the interested node, the numbers of data packets in which the address of the interested node is set as local destinations LD are stored. In a field for the transmission record information, information on the ratio of the number of data packets transmitted through paths extending through the interested node to the number of data packets transmitted by each of the adjacent nodes is stored. Specifically, the ratio of the number of data packets of which destinations are the interested node to the number of all data packets transmitted by each of the adjacent nodes is stored.

In the other embodiment, the nodes Nx each have a non-directional antenna. Thus, each of the nodes Nx may receive a data packet of which a local destination LD is not the interested node.

In the other embodiment, the interested node uses all received packets to count the number of all data packets transmitted by each of the adjacent nodes. The acquirer 16 counts, for each of the adjacent nodes, the number of packets in which an address of the adjacent node is set as local sources LS. If a data packet received by the interested node is a data packet in which the interested node is not set as a local destination LD, the acquirer 16 counts the number of received data packets and discards the received data packet.

In addition, the acquirer 16 counts the numbers of data packets in which the addresses of the adjacent nodes are set as local sources, and the interested node is set as local destinations LD. If the interested node receives a data packet in which the interested node is set as a local destination LD, the acquirer 16 requests the selector 17 to select a path and transfers the data packet.

The acquirer 16 counts the number of all data packets transmitted by each of the adjacent nodes and the number of data packets in which the interested node is set as local destinations LD and that are transmitted by each of the adjacent nodes. Then, the acquirer 16 uses the counted numbers to calculate the ratio of the number of data packets of which destinations are the interested node to the number of all data packets transmitted by each of the adjacent nodes. In the present embodiment, the number of data packets received by the interested node is treated as the total number of data packets transmitted by the adjacent nodes.

In the example illustrated in FIG. 6, since the number of all data packets transmitted by the adjacent node "Nb" is "10" and the number of data packets that are transmitted by the adjacent node "Nb" and of which destinations are the interested node is transmission record information for the adjacent node "Nb" is "0.1". Since the rate at which the adjacent node "Nb" transmits a data packet through the node Na is low, it is estimated that the priority path of the adjacent node "Nb" does not extend through the node Na.

The acquirer 16 specifies an adjacent node satisfying the requirement as a node having, set therein, a priority path that, does not extend through the interested node. Then, the acquirer 16 sets "1" to a flag of the path information storage unit 18. The acquirer 16 specifies an adjacent node that does not satisfy the requirement as a node having, set therein, a priority path that extends through the interested node. Then, the acquirer 16 sets "0" to a flag of the path information storage unit 18.

For example, if a value stored as transmission record information is equal to or smaller than the threshold, the acquirer 16 determines that the requirement is satisfied. The threshold is arbitrarily set. For example, the threshold is set to 0.6.

Figure 7:
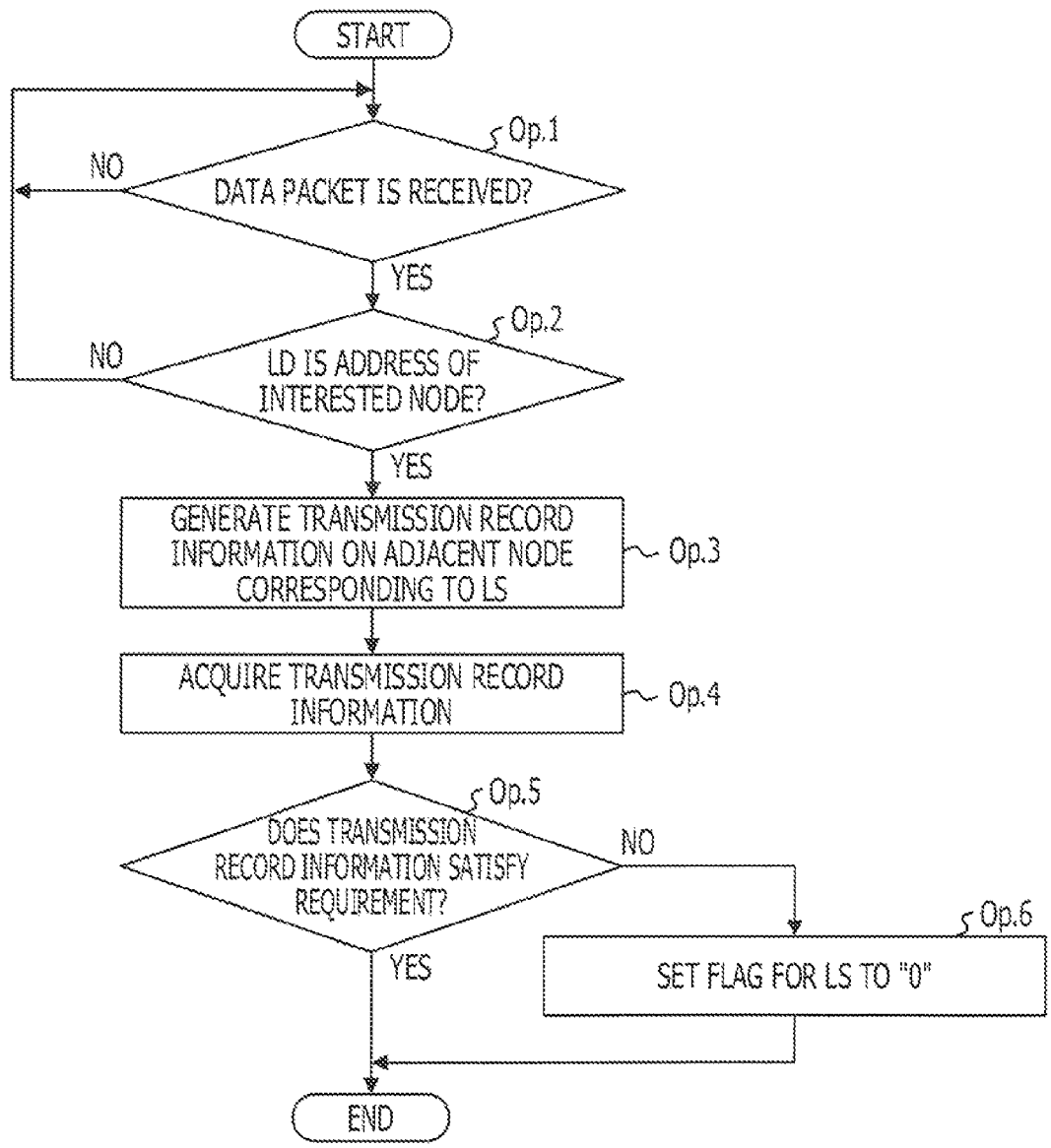
FIG. 7 is a flowchart of a process of acquiring transmission record information by an acquirer.

Next, a process of acquiring transmission record information of each of the nodes Nx is described. FIG. 7 is a flowchart of the process of acquiring transmission record information by the acquirer 16. FIG. 7 is the flowchart in the case where the interested node acquires the transmission record information when each of the nodes Nx periodically transmits a data packet to the sink node SN in the ad-hoc network.

The acquirer 16 acquires a packet received by the receiver 13 and determines whether or not the acquired packet is a data packet (in Op. 1). For example, if a global source GS and a global destination GD are set in the packet received by the receiver 13, the acquirer 16 determines that the received packet is a data packet. The acquirer 16 repeats Op. 1 until receiving a data packet (No in Op. 1).

If the packet has a packet type, the acquirer 16 may determine, based on the packet type, whether or not the packet is a data packet. For example, it is assumed that a packet, of which a packet type is "1" is a hello packet and a packet of which a packet type is "2" is a data packet. Based on this assumption, if the packet, type of the packet received by the receiver 13 is "2", the acquirer 16 determines that the packet is the data packet in Op. 1.

If the packet received by the receiver 13 is the data packet (Yes in Op. 1), the acquirer 16 determines whether or not the address of the interested node is set as a local destination LD of the received data packet in Op. 2). If the nodes Nx each have a high-directivity antenna, Op. 2 may be omitted. If the nodes Nx each have a non-directional antenna, the receiver 13 may receive a data packet other than a data packet in which the address of the interested node is set as a local destination LD, the process of Op. 2 is executed.

If the address of the interested node is set as the local destination LD (Yes in Op. 2), the acquirer 16 references the transmission record information storage unit 19 and generates transmission record information for an adjacent node corresponding to a local source LS of the data packet (in Op. 3). If transmission record information is already stored, the transmission record information is updated in the process of Op. 3.

For example, in the example illustrated in FIG. 5 and indicating the transmission record information, the acquirer 16 adds 1 to the number, stored as the transmission record information, of received packets for the adjacent node corresponding to the local source LS of the received data packet.

Then, the acquirer 16 acquires the transmission record information (in Op. 4). The acquirer 16 determines whether or not the acquired transmission record information satisfies the predetermined requirement (in Op. 5). For example, the acquirer 16 determines whether or not a value stored as the transmission record information is equal to or smaller than the threshold.

If the transmission record information satisfies the predetermined requirement (Yes in Op. 5), the acquirer 16 terminates the process. Specifically, a flag stored in the path information storage unit 18 is maintained at the initial level that is "1". On the other hand, if the transmission record information does not satisfy the predetermined requirement (No in Op. 5), the acquirer 16 sets, to "0", the flag stored in the path information storage unit 18 and provided for the adjacent node corresponding to the local source LS of the data packet (in Op. 6).

In the example illustrated in FIG. 7, if the address of the interested node is not set as the local destination LD (No in Op. 2), the process returns to Op. 1. However, if the acquirer 16 acquires the transmission record information illustrated in FIG. 6, the acquirer 16 adds "1" to the number of all data packets before the process returns to Op. 1.

The transmission record information may be cleared at certain time intervals. In this case, flags based on transmission record information corresponding to the certain time interval before the transmission record information is cleared are used for selection of an alternative path. In addition, Op. 1 to Op. 3 are executed and Op. 4 to Op. 6 may be executed after a certain time elapses after the execution of Op. 1 to Op. 3. Specifically, after the adjacent nodes each transmit a certain number of data packets, transmission record information on the transmission of the data packets is acquired. Then, the acquirer 16 may use the acquired transmission record information to execute the determination process (in Op. 5).

In the aforementioned manner, the acquirer 16 may acquire the transmission record information on the adjacent nodes. In addition, the acquirer 16 may acquire the transmission record information regardless of whether data packets are periodically or irregularly transmitted in the network. Each of the nodes Nx may use transmission record information to recognize whether or not adjacent nodes have, as priority paths, paths set therein and extending through the interested node.

Figure 8:
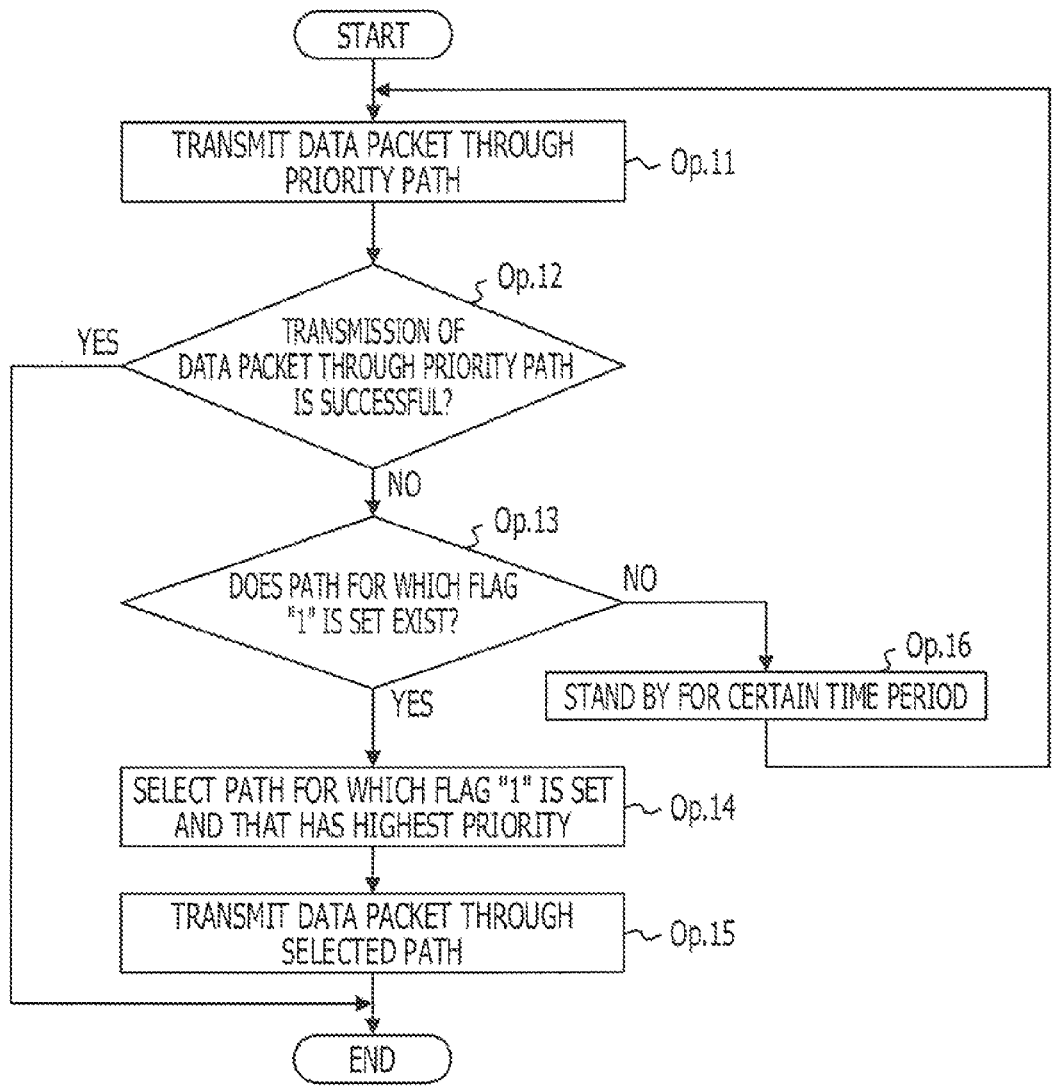
FIG. 8 is a flowchart of process of selecting an alternative path.

Next, a process of selecting an alternative path for transmission of a data packet is described. FIG. 8 is a flowchart of the process of selecting an alternative path. First, the transmitter 14 transmits a data packet through a priority path under control of the controller 11 (in Op. 11).

The transmission of the data packet through the priority path is briefly described. First, if the interested node is a global source GS of the data packet, the controller 11 generates data to be transmitted to the server S and causes the generated data to be stored in a payload storage portion 22 of the data packet. Then, the selector 17 references the path information storage unit 18 and selects a path with the highest quality from among paths extending to a global destination GD that is the "sink node SN". For example, a priority path with the priority "1" is selected.

Then, the selector 17 acquires, from the path information storage unit 18, a local destination LD corresponding to the selected path. Then, header information of various types is set in a header information storage portion 21 of the packet. The address of the interested node is set as a local source GS and a local destination LD. Then, the data packet is transmitted through the priority path.

Secondly, if the interested node is a local source LS (the data packet is transferred), the selector 17 rewrites header information of data packets received from the adjacent nodes. Specifically, the address of the interested node is set as the local source LS, and an address of an adjacent node through which the priority path of the interested node extends is set as the local destination LD. Then, the data packet is transmitted through the priority path.

Next, the selector 17 determines whether or not the transmission of the data packet through the priority path is successful (in Op. 12). For example, the selector 17 determines whether or not the transmission of the data pocket through the priority path is successful by determining whether or not the interested node receives a response indicating reception of the data packet from the sink node SN within a certain time period after the transmission of the data packet. If the interested node receives the response within the certain time period, the selector 17 determines that the transmission of the data packet through the priority path is successful.

If the transmission of the data packet is successful (Yes in Op. 12), the process of selecting an alternative path is terminated. On the other hand, if the transmission of the data packet is not successful (No in Op. 12), the selector 17 references the path information storage unit 18 and determines whether or not a path for which the flag "1" is set exists (in Op. 13). In Op. 13, the selector 17 determines whether or not a path for which the flag "1" is set and which is not the priority path exists. In Op. 13, the determination of Op. 5 illustrated in FIG. 7 may be executed instead of the determination using the flag, for example.

Specifically, in Op. 13, the selector 17 determines whether or not an adjacent node of which a priority path does not extend through the interested node exists. In other words, the selector 17 determines whether or not a path through which a data packet is not transmitted to the interested node from an adjacent node exists even if the interested node transmits a data packet to the adjacent node that is a local destination LD for each of paths.

If paths for which the flag "1" is set exist (Yes in Op. 13), the selector 17 selects a path with the highest priority from among the paths for which the flag "1" is set (in Op. 14). Specifically, the path that is among paths other than the priority path and has the highest priority (with a value of 2 or smaller) and for which the flag "1" is set is selected.

Then, the selector 17 generates header information based on the selected path, and the transmitter 14 transmits the data packet (in Op. 15). Then, the controller 11 terminates the process.

The selector 17 may monitor whether or not the transmission of the data packet through the alternative path is successful in the same manner as the transmission of the data packet through the priority path. If the transmission of the data packet through the alternative path is not successful, another alternative path may be selected.

If a path for which the flag "1" is set does not exist (No in Op. 13), the selector 17 stands by for a certain time period (in Op. 16). The transmitter 14 transmits the data packet through the priority path again (in Op. 11).

In the present embodiment, an appropriate alternative path is selected in the aforementioned manner. Specifically, the selector 17 selects, as a path, an adjacent node of which a priority path does not extend through the interested node. Thus, if a failure occurs in a priority path of the interested node, the nodes may each select a path that is highly likely to avoid the priority path.

Figure 9:
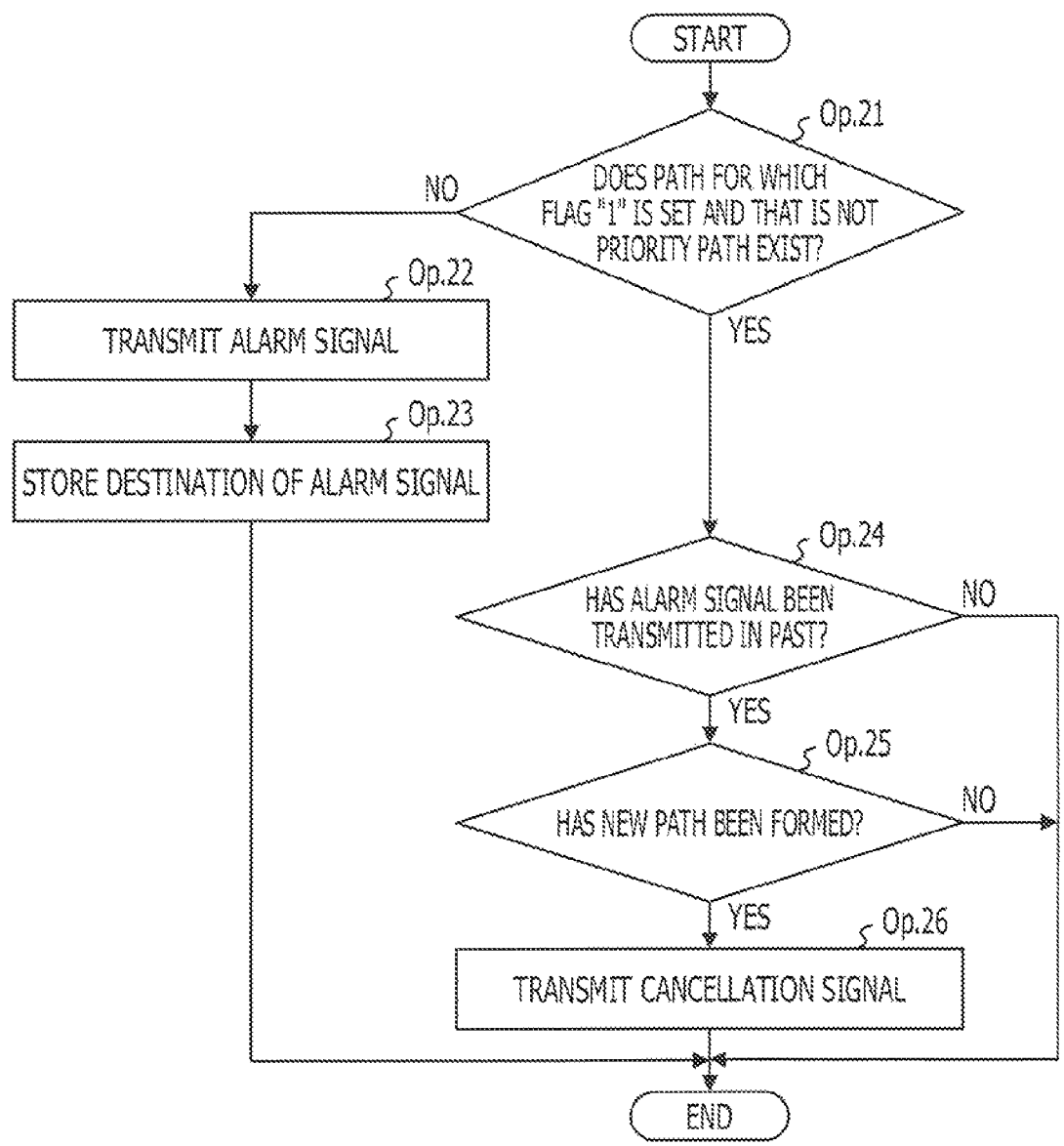
FIG. 9 is a flowchart of a process of transmitting an alarm signal.

Next, a process to be executed by each of the nodes when an available alternative path other than a priority path does not exist is described. FIG. 9 is a flowchart of a process of transmitting an alarm signal. In the present embodiment, the process of transmitting an alarm signal is executed when a failure of the priority path is detected. The process of transmitting an alarm signal, however, is not limited to this, and may be periodically executed.

First, the selector 17 references the path information storage unit 18 and determines whether or not a path that is not a priority path and for which the flag "1" is set exists (in Op. 21). If a path that is not the priority path and for which the flag "1" is set does not exist (No in Op. 21), the transmitter 14 transmits an alarm signal under control of the controller 11 (in Op. 22).

The alarm signal is a signal that notifies the adjacent nodes that the interested node does not have an available alternative path other than the priority path. The alarm signal is transmitted to the adjacent nodes. Specifically, the alarm signal is transmitted to the adjacent nodes recorded as the local destinations LD in the path information storage unit 1 at the time of the transmission of the alarm signal.

The alarm signal may be transmitted in unicast to each of the adjacent nodes or broadcasted to all the adjacent nodes. If a plurality of devices that are set as global destinations GD exist, the alarm signal includes identification information that indicates any of the global destinations GD that is a destination of the alarm signal.

Next, the selector 17 causes the destination of the alarm signal to be stored in the storage unit 12 (in Op. 23). For example, upon the transmission of the alarm signal, the adjacent nodes recorded as the local destinations LD in the path information storage unit 18 are stored in the storage unit 12. Then, the selector 17 terminates the process.

If a path that is not the priority path and for which the flag it is set exists (Yes in Op. 21), the selector 17 determines whether or not an alarm signal has been transmitted in the past (in Op. 24). For example, if the destination of the alarm signal is already stored, the selector 17 determines that the alarm signal has been transmitted in the past.

If the alarm signal has been transmitted in the past (Yes in Op. 24), the selector 17 determines whether or not a new path has been formed (in Op. 25). The new path is a path for which an adjacent node other than the destination of the alarm signal is set as a local destination LD.

In an autonomous distributed network that is the ad-hoc network or the like, a new path is formed due to a change of a topology of the network in some cases. The case where the new path is formed includes a case where a node is physically added and a case where a communication state is changed due to a change of a surrounding environment. The generator 15 periodically generates path information. If the path information storage unit 18 has stored therein information of a new path at the time of the execution of the process (illustrated in FIG. 9) of transmitting an alarm signal, the selector 17 determines that the new path has been formed. For example, if a path for which a node other than a node stored as the destination of the alarm signal is set as a local destination LD is stored in the path information storage unit 18, the selector 17 determines that the new path has been formed.

A process of generating path information is executed independently of the process of transmitting an alarm signal. The two processes, however, may be synchronized with each other. Specifically, if path information is generated or updated at certain time intervals, the process of transmitting an alarm signal may be executed subsequently to the process of generating or updating the path information.

If the new path has been formed (Yes in Op. 25), the transmitter 14 transmits a cancellation signal under control of the controller 11 (in Op. 26). The cancellation signal is a signal that notifies the adjacent nodes that the interested node has an available alternative path other than the priority path.

The cancellation signal may be transmitted to a destination of an alarm signal transmitted in the past. Alternatively, the cancellation signal may be transmitted to adjacent nodes recorded as local destinations LD in the path information storage unit 18 at the time of the transmission of the cancellation signal.

If an alarm signal has not been transmitted in the past (No in Op. 24) or a new path is not formed (No in Op. 25) the selector 17 terminates the process.

As described above, if any of the nodes Nx detects that the node does not have an available alternative path other than a priority path, the interested node may notifies the other adjacent nodes that the interested node is unstable. If a new path is formed, the interested node may notify the adjacent nodes that the interested node has the available alternative path.

Figure 10:
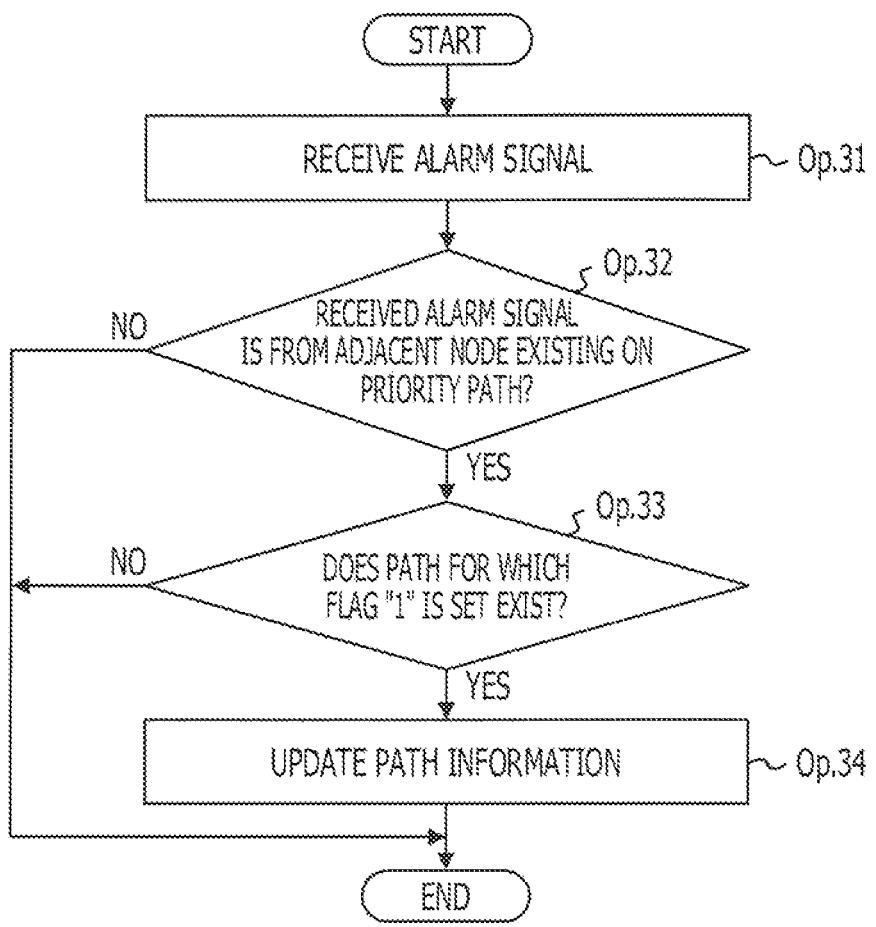
FIG. 10 is a flowchart of a process of reforming a path in response to reception of an alarm signal.

Next, a process to be executed by each of the nodes when the node receives an alarm signal is described. FIG. 10 is a flowchart of the process of reforming a path in response to reception of the alarm signal. When any of the nodes Nx receives an alarm signal from another node in response to the process (illustrated in FIG. 9) of transmitting the alarm signal, air the process illustrated in FIG. 10 is executed.

The receiver 13 receives an alarm signal from an adjacent node (in Op. 31). Then, the generator 15 determines whether or not the alarm signal is received from the adjacent node, that exists on a priority path (in Op. 32). For example, the generator 15 determines whether or not a local destination LD set in the alarm signal matches a local destination LD of a path with the priority "1" in the path information storage unit 18.

If the received alarm signal is transmitted from the adjacent node that exists on the priority path (Yes in Op. 32), the generator 15 determines whether or not a path for which the flag "1" is set and that is not the priority path exists (in Op. 33). If the path for which the flag "1" is set and that is not the priority path exists (Yes in Op. 33), the generator 15 updates the path information stored in the path information storage unit 18 (in Op. 34). Specifically, the generator 15 updates the priorities set for the paths in the path information storage unit 18.

For example, the generator 15 sets a priority corresponding to a previously set priority path to a predetermined value such as "99" and adds "1", "2", "3", " . . . " to remaining paths having priorities other than the priority "99" so that the higher priority a path has, the smaller the value of the priority of the path.

If the received alarm signal is not transmitted from the adjacent node that exists on the priority path (No in Op. 32), or a path for which the flag "1" is set and that is not the priority path does not exist (No in Op. 33), the generator 15 terminates the process.

In the present embodiment, if the received alarm signal is not transmitted from the adjacent node that exists on the priority path, the generator 15 determines that the path information is not to be updated. A priority of a path for which the adjacent node that is the source of the alarm signal is set as a local destination LD may be set to the lowest priority.

In the present embodiment, if a path for which the flag "1" is set and that is not the priority path does not exist, the generator 15 determines that the path information is not to be updated. This is a state in which an adjacent node of which a priority path does not extend through the interested node does not exist or a state in which an available alternative path does not exist. Thus, in a state in which another path is not used as a priority path, the path information is not updated.

The path that is charged from the priority path to a path other than the priority path in response to the reception of the alarm signal is set to the priority path again in response to reception of a cancellation signal. In the present embodiment, if the cancellation signal is received, the generator 15 determines whether or not a path for which a source of the cancellation signal is set as a local destination LD and that has the priority of the predetermined value (for example "99") exists. Then, if the path exists, the generator 15 adds the priority "1" to the path again.

In the aforementioned manner, the priority path of the in rested node may be reformed in response to the reception of the alarm signal. Specifically, the nodes Nx according to the present embodiment may each update path information so that, the updated path information indicates that a path other than a path for which an unstable adjacent node is set as a local destination LD is set to a priority path. In addition, the nodes Nx may each reform a high-quality path as a priority path at an appropriate time.

For example, if the process (illustrated in FIG. 9) of transmitting an alarm signal is executed in response to detection of a failure of a priority path of a first node among the plurality of nodes Nx, a second node that is among the plurality of nodes Nx and has received the alarm signal may recognize that the failure occurs in the priority path of the first node and that the first node does not have an available alternative path.

If the second node sets the first node as a priority path of the interested node, and the priority path is used, it may be predicted that transmission of a data packet is highly likely to fail. Thus, the second node updates priorities of path information. Specifically, the second node resets, to a priority path, a path other than a path for which the first node is set to a local destination LD.

If the process (illustrated in FIG. 9) of transmitting an alarm signal is periodically executed, the second node that has received the alarm signal may recognize that the first node that is a source of the alarm signal does not have an available alternative path. If the first node exists on a priority path of the interested node, and a failure occurs in a priority path of the first node for some reason, the second node may recognize that there is a probability that a data packet fails to be transmitted.

This is due to the fact that the first node does not have an available alternative path and a data packet is not transferred through a path other than the priority path. Thus, the second node updates the priorities of the path information. Specifically, the second node resets, to a priority path, a path other than a path for which the first node is set as a local destination LD.

Until the nodes Nx each acquire transmission record information on adjacent nodes, the nodes Nx may each use, as an alternative path, a path with the second highest quality after a priority path. In addition, the nodes may each periodically select, based on transmission record information obtained at predetermined time intervals, an adjacent node to be used as an alternative path. In addition, if a plurality of adjacent nodes of which priority paths do not extend through the interested node exist, a path with the highest quality is selected.

Transmission record information may be referenced in order to select a priority path. For example, a path that is among paths (indicated in FIG. 4) corresponding to the flag "1" and has the smallest path cost among the paths (indicated in FIG. 4) may be selected as a priority path.

Figure 11:
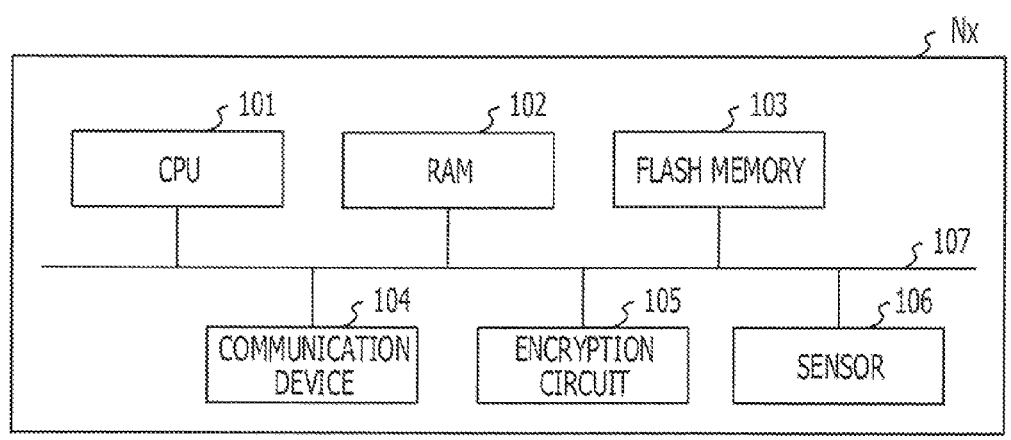
FIG. 11 is a diagram illustrating an example of a hardware configuration of the node Nx.

Next, a hardware configuration of each of the nodes Nx is described. FIG. 11 is a diagram illustrating an example of the hardware configuration of the node Nx. The node Nx is a computer that has a radio communication function. The node Nx has a central processing unit (CPU) 101, adorn access memory (RAM) 102, a flash memory 103, a communication device 104, and a bus 107. The CPU 101, the RAM 102, the flash memory 103, and the communication device 104 are connected to each other by the bus 107.

The CPU 101 controls the overall node Nx. The CPU 101 functions as the controller 11 or the like by executing a program loaded in the RAM 102.

The RAM 102 is used as a work area of the CPU 101. The flash memory 103 stores the program, the path information, and the transmission record information. The flash memory 103 is an example of the storage unit 102. The program includes a program to be used to execute the processes indicated by the flowcharts. For example, a control program that causes the node Nx to execute the communication processes illustrated in FIGS. 7 to 10 is stored in the flash memory 103.

The node Nx functions as the controller 11 illustrated in FIG. 3 by loading the program stored in the flash memory 103 in the RAM 102 and causing the CPU 101 to execute the program. The node Nx executes the processes illustrated in FIGS. 7 to 10.

The communication device 104 transmits and receives a packet by multi-hop communication. The communication device 104 is an example of the communicator 10. The communication device 104 includes an antenna and a communication circuit.

The node Nx may have an encryption circuit 105 and a sensor 106. The encryption circuit 105 is a circuit that encrypts data using an encryption key when the data is to be encrypted. For example, if a packet is to be encrypted and transmitted, the encryption circuit 105 functions. If the encryption is executed by software, a program corresponding to the encryption circuit 105 is stored in the flash memory 103 and the encryption circuit 105 is not used.

The sensor 106 detects data specific to the sensor 106. For example, the sensor 106 detects data of a target to be measured. Examples of the data of the target to be measured are a temperature, a humidity level, a water level, precipitation, an air volume, a sound volume, the amount of power used, a time period, a time, and acceleration. The CPU 101 may acquire the data from the sensor 106. For example, the data, detected by the sensor 106 is stored in a payload data storage portion 22 of a data packet and collected by the server S.

The node Nx may be a general-purpose computer provided with a wireless communication function or a computer such as a mobile phone or a smart phone. In this case, the node Nx has a central processing unit (CPU), a read only memory (ROM), a random access memory (RAM), a communication device, a hard disk drive (HDD), an input device, a display device, and a medium reader, while the parts of the node Nx are connected to each other through a bus.

A communication program to be used to execute the processes indicated by the flowcharts is stored in a computer-readable recording medium. Examples of the computer-readable recording medium are a magnetic recording device, an optical disc, a magneto-optical recording medium, and a semiconductor memory. Examples of the magnetic recording device are an HDD, a flexible disk (FD), and a magnetic tape (MT).

Examples of the optical disc are a digital versatile disc (DVD), a DVD-RAM, a compact disc-read only memory (CD-ROM), a CD-Recordable (CD-R), and a CD-Rewritable (CD-RW). An example of the magneto-optical recording medium is a magneto-optical disk (MO). In order to distribute the program, a portable recording medium that has the program stored therein and is a DVD, a CD-ROM or the like may be sold, for example.

The computer that executes the communication program according to the present embodiment causes the medium reader to read the communication program from a recording medium having the communication program stored therein, for example. The CPU causes the read communication program to be stored in the HDD, the ROM, or the RAM.

The CPU is a central processing device that controls the overall node Nx. The CPU reads the communication program from the HDD, executes the communication program, and thereby functions as the controller 11 illustrated in FIG. 3. The communication program may be stored in the ROM or RAM, which is accessible from the CPU. The communication device functions as the communicator 10 under control of the CPU.

The HDD functions as the storage unit 12 (illustrated in FIG. 2) under control of the CPU. Specifically, the HDD stores the path information and the transmission record information. Similarly to the communication program, the path information and the transmission record information may be stored in the ROM or RAM, which is accessible from the CPU. The information of the various types, which is generated in the processes, is stored in the RAM, for example.

The input device receives entries of various types. The input device is a keyboard, a mouse, or the like. The display device displays information of various types. The display device is a display, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node device for wireless communications, the node device being coupled to a plurality of adjacent node devices including a first adjacent node and a second adjacent node, the node device comprising:
    a memory; and
    a processor coupled to the memory and configured to:
        obtain record information from each of the plurality of adjacent node devices, the record information being configured to indicate a ratio of a first number to a second number for each of the plurality of adjacent node devices, the second number representing a total number of packets transmitted from each of the plurality of adjacent node devices respectively to other node devices including the node device and the first number representing a number of packets which are transmitted from each of the plurality of adjacent node devices respectively to the node device,
        wherein the ratio of the first number to the second number representing a probability that a packet transmitted from the node device to each of the plurality of adjacent node devices is returned to the node device from each of the plurality of adjacent node devices respectively,
        compare the ratios of the plurality of adjacent node devices respectively with a threshold,
        transmit the packet toward the first adjacent node,
        when the packet does not reach the first adjacent node due to a communication failure that occurred between the node device and the first adjacent node device, select, among the plurality of adjacent node devices, the second adjacent node device of which the ratio is lower than the threshold, and
        transmit the packet to the selected second adjacent node device.

2. The node device according to claim 1, wherein the processor is further configured to:
    generate a plurality of paths, each of the plurality of paths extending from the node device to a destination device via at least one adjacent node device included in the plurality of adjacent node devices, and
    set one of the plurality of paths as a priority path which is used for communicating with the destination device on a priority basis.

3. The node device according to claim 2, wherein the processor is configured to select the second adjacent node device and transmit the packet to the second adjacent node device, upon detecting a failure in transmitting the packet using the priority path.

4. The node device according to claim 1,
    wherein each of the plurality of adjacent node devices is configured to transmit the packets periodically at a certain frequency to other node devices, and
    wherein the node device acquires the record information by counting a number of packets received from each of the plurality of adjacent node devices respectively in a certain time period.

5. The node device according to claim 1, wherein the processor is further configured to transmit a first alarm signal to the plurality of adjacent node devices if the plurality of adjacent node devices do not have the further adjacent node device other than the node device, the first alarm signal indicating that there is no adjacent node of which the ratio is lower than the threshold.

6. The node device according to claim 5, wherein the processor is further configured to:
    receive a second alarm signal generated by any one of the plurality of adjacent node devices, and
    exclude a path to the destination via the any one of the plurality of adjacent node devices when the packet is transmitted.

7. A communication method executed by a node device for wireless communication, the node device being coupled to a plurality of adjacent node devices including a first adjacent node and a second adjacent node, the communication method comprising:
    obtaining record information from each of the plurality of adjacent node devices, the record information being configured to indicate a ratio of a first number to a second number for each of the plurality of adjacent node devices, the second number representing a total number of packets transmitted from each of the plurality of adjacent node devices respectively to other node devices including the node device and the first number representing a number of packets which are transmitted from each of the plurality of adjacent node devices respectively to the node device;
    wherein the ratio of the first number to the second number representing a probability that a packet transmitted from the node device to each of the plurality of adjacent node devices is returned to the node device from each of the plurality of adjacent node devices respectively,
    comparing the ratios of the plurality of adjacent node devices respectively with a threshold;
    transmitting the packet toward the first adjacent node,
    when the packet does not reach the first adjacent node due to a communication failure that occurred between the node device and the first adjacent node device, selecting, among the plurality of adjacent node devices, the second adjacent node device of which the ratio is lower than the threshold; and
    transmitting the packet to the selected second adjacent node device.

8. The communication method according to claim 7, further comprising:
    generating a plurality of paths, each of the plurality of paths extending from the node device to a destination device via at least one adjacent node device included in the plurality of adjacent node devices; and
    setting one of the plurality of paths as a priority path which is used for communicating with the destination device on a priority basis.

9. The communication method according to claim 8, wherein the selecting and the transmitting are executed, upon detecting a failure in transmitting the packet using the priority path.

10. The communication method according to claim 7,
    wherein each of the plurality of adjacent node devices is configured to transmit the packets periodically at a certain frequency to other node devices, and
    wherein the node device acquires the record information by counting a number of packets received from each of the plurality of adjacent node devices respectively in a certain time period.

11. The communication method according to claim 7, further comprising:
    transmitting a first alarm signal to the plurality of adjacent node devices if the plurality of adjacent node devices do not have the further adjacent node device other than the node device, the first alarm signal indicating that there is no adjacent node of which the ratio is lower than the threshold.

12. The communication method according to claim 11, further comprising:
receiving a second alarm signal generated by any one of the plurality of adjacent node devices; and
excluding a path to the destination via the any one of the plurality of adjacent node devices when the packet is transmitted.

13. A device for wireless communications, the device being coupled to a plurality of adjacent devices including a first adjacent device and a second adjacent device, the device comprising:
a memory; and
a processor coupled to the memory and configured to:
obtain record information from each of the plurality of adjacent devices, the record information being configured to indicate a ratio of a first number to a second number for each of the plurality of adjacent devices, the second number representing a total number of packets transmitted from each of the plurality of adjacent devices respectively to other devices including the device and the first number representing a number of packets which are transmitted from each of the plurality of adjacent devices respectively to the device;
wherein the ratio of the first number to the second number representing a probability that a packet transmitted from the device to each of the plurality of adjacent devices is returned to the device from each of the plurality of adjacent devices respectively,
transmit the packet toward the first adjacent device,
in response to detecting a failure in transmitting a packet from the device to the first adjacent device, select the second adjacent device from one of a plurality of adjacent devices that directly communicates with the device based on the record information, the ratio of the selected second adjacent device being lower than a threshold, and
transmit the packet to the selected second adjacent device.

* * * * *